(12) United States Patent
Chen et al.

(10) Patent No.: US 7,303,414 B2
(45) Date of Patent: Dec. 4, 2007

(54) SURFACE CONTACT CARD HOLDER

(75) Inventors: Rui-Hao Chen, Shenzhen (CN); Hsiao-Hua Tu, Tu-Cheng (TW); Chia-Hua Chen, Tu-Cheng (TW)

(73) Assignees: ShenZhen FuTaiHong Precision Industry Co., Ltd., Shenzhen, Guangdong Province (CN); Sutech Trading Limited, Tortola (VG)

( * ) Notice: Subject to any disclaimer, the term of this patent is extended or adjusted under 35 U.S.C. 154(b) by 0 days.

(21) Appl. No.: 11/309,319

(22) Filed: Jul. 26, 2006

(65) Prior Publication Data
US 2007/0087600 A1  Apr. 19, 2007

(30) Foreign Application Priority Data
Oct. 14, 2005 (CN) .................... 2005 1 0100379

(51) Int. Cl.
*H01R 13/62* (2006.01)

(52) U.S. Cl. ...................... 439/155; 439/923

(58) Field of Classification Search ............... 439/159, 439/152, 153, 155, 923, 327
See application file for complete search history.

(56) References Cited

U.S. PATENT DOCUMENTS 6,382,995 B1 *  5/2002  Bricaud et al. ............. 439/159

\* cited by examiner

*Primary Examiner*—Javaid H. Nasri
(74) *Attorney, Agent, or Firm*—Jeffrey T. Knapp

(57) ABSTRACT

A holder for holding a surface contact card (40) includes a main body (10), a latch (20), a fixing portion (18) and an elastic element (30). The main body defines a receiving groove (16) and a sliding groove (17). The receiving groove is located at one side of the main body. The sliding groove is configured for receiving the surface contact card therein. The latch engages the receiving groove and selectably encloses one end of the surface contact card. The fixing portion is provided on the opposite side of the main body adjacent to the sliding groove. The elastic element sets in the fixing portion and configures for resisting the other end of the surface contact card. The elastic element provides a force allowing removal of the surface contact card.

20 Claims, 7 Drawing Sheets

SURFACE CONTACT CARD HOLDER

FIELD OF THE INVENTION

The present invention generally relates to structures for holding card members in an electronic device and, particularly, to a surface contact card holder for holding a surface contact card in a portable electronic device.

DESCRIPTION OF RELATED ART

With the development of wireless communication and information processing technologies, portable electronic devices such as mobile phones are now in widespread use. These electronic devices enable consumers to enjoy high-tech services anytime and anywhere. Surface contact cards having special circuits are widely used in portable electronic devices to enhance or specialize the functions of the portable electronic devices. For example, a subscriber identity module (SIM) card can be placed in a mobile phone to dedicate the mobile phone' functions to the SIM card owner. By changing SIM cards, a single mobile phone can be used by many different SIM card owners as a personal phone.

Referring now to FIG. 7, a conventional structure for holding a SIM card therein includes a base 42 made of insulating material and a holding structure 44. The base 42 defines a receiving groove 421 and a SIM connector 40 including a plurality of contacts is set in the middle of the receiving groove 421. The shape and size of the receiving groove 421 are the same as those of the SIM card. The holding structure 44 is located adjacent to one end of the receiving groove 421 and can be moved back and forth along the direction as indicated by the arrow shown in FIG. 7.

In use, firstly, the holding structure 44 is moved away from the receiving groove 421 and the SIM card is inserted into the receiving groove 421. Then, the holding structure 44 is moved adjacent to the receiving groove 421 so as to latch the SIM card in the receiving groove 421. In the same way, the SIM card can be released by moving the holding structure 44 away from the receiving groove 421.

In the above conventional structure for holding a SIM card, the holding structure 44 can be easily moved, if a mobile phone employing such a structure for holding a SIM card is dropped, the shock may easily force the holding structure 44 to move off the receiving groove 421. As a result, the SIM card may not connect well with the SIM contactor or may even become separated from the receiving groove 421. Obviously, such a conventional structure cannot hold the SIM card steadily in the receiving groove 421.

Therefore, there is a need for a new surface contact card holder which can hold a surface contact card steadily in a portable electronic device.

SUMMARY OF THE INVENTION

In one embodiment, a holder for holding a surface contact card includes a main body, a latch, a fixing portion and an elastic element. The main body defines a receiving groove and a sliding groove. The receiving groove is located at one side of the main body. The sliding groove is configured for receiving the surface contact card therein. The latch engages in the receiving groove and selectably resists one end of the surface contact card. The fixing portion is positioned on the opposite side of the main body adjacent to the sliding groove. The elastic element is located the fixing portion and is configured for resisting the other end of the surface contact card. The elastic element provides a force allowing removal of the surface contact card.

Other advantages and novel features of the present embodiment will become more apparent from the following detailed description thereof when taken in conjunction with the accompanying drawings.

BRIEF DESCRIPTION OF THE DRAWINGS

Many aspects of the surface contact card holder can be better understood with reference to the following drawings. The components in the drawings are not necessarily drawn to scale, the emphasis instead being placed upon clearly illustrating the principles of the present surface contact card holder. Moreover, in the drawings, like reference numerals designate corresponding parts throughout the several views.

DETAILED DESCRIPTION OF THE INVENTION

The present surface contact card holder is suitable for portable electronic devices, such as mobile phones, PDAs, and so on. The surface contact card holder can be used for holding surface contact cards such as SIM cards, compact flash cards (CFs), multimedia cards (MMCs), and so on.

Figure 1:
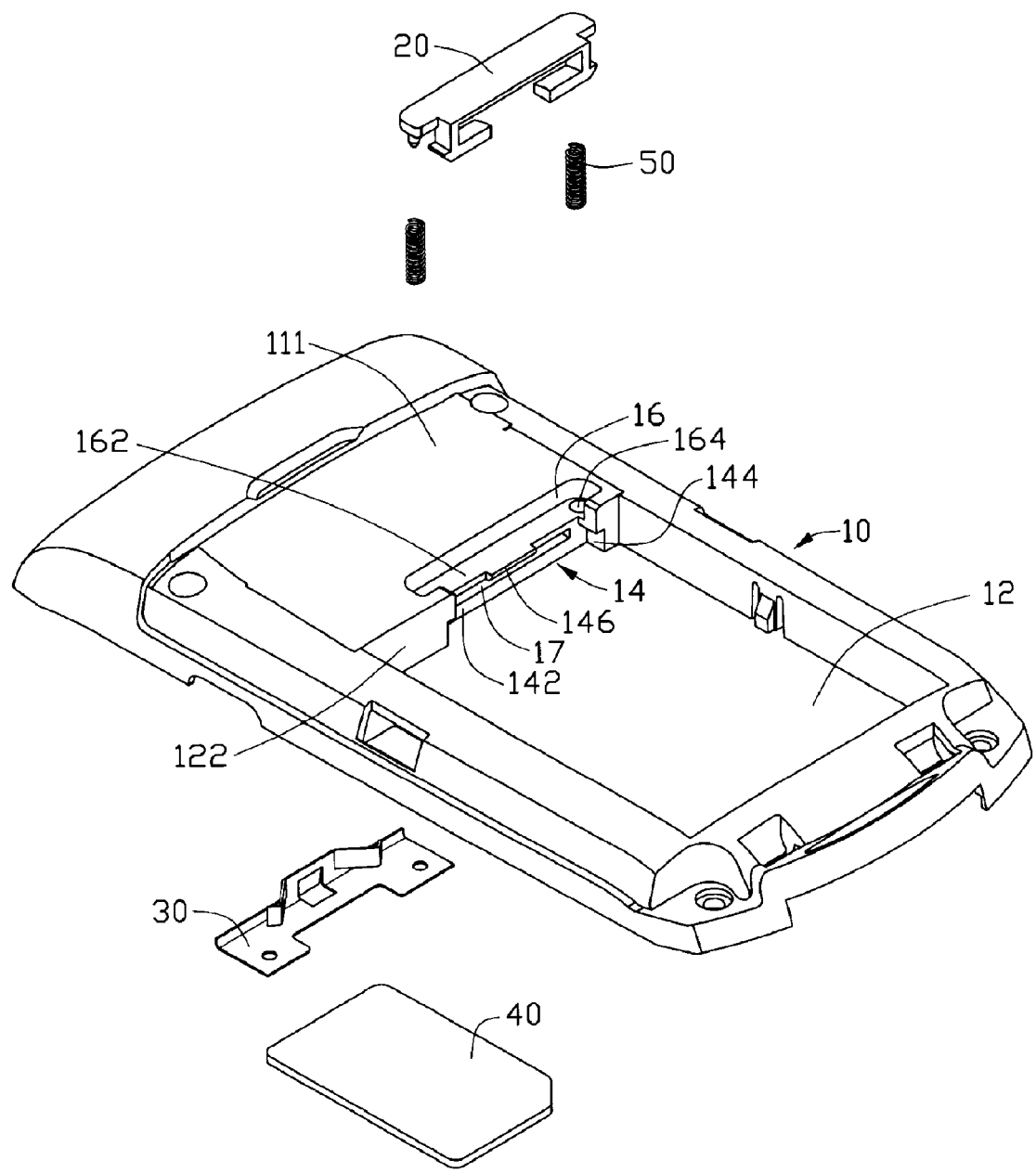
FIG. 1 is an exploded, isometric view of a surface contact card holder with a surface contact card in accordance with a preferred embodiment.
Figure 2:
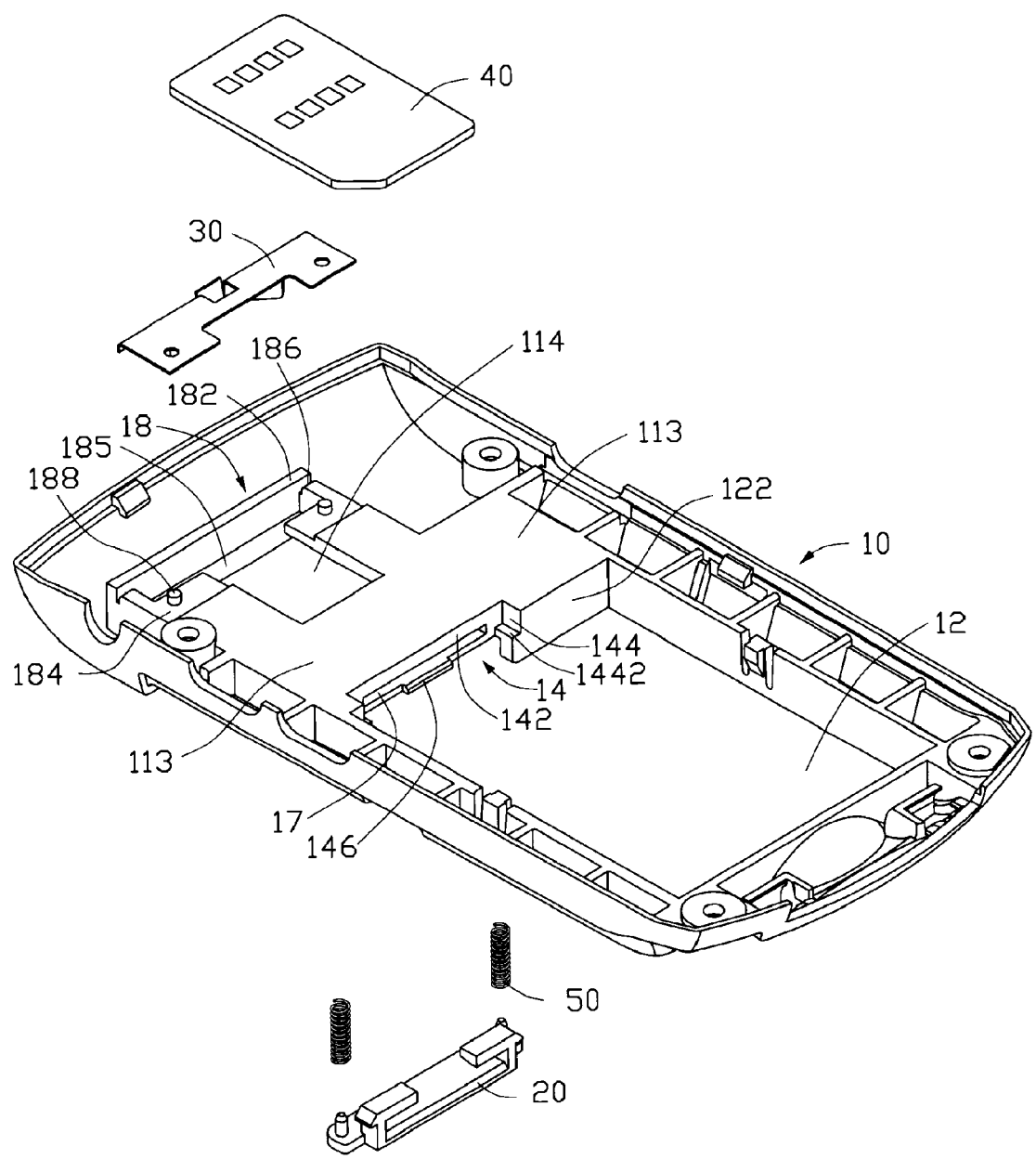
FIG. 2 is similar to FIG. 1 but viewed from another aspect.

Referring now to the drawings in detail, FIGS. 1 and 2 show a surface contact card holder for a SIM card 40 incorporated in a mobile phone/portable electronic device. The mobile phone and the SIM card 40 are taken here as an exemplary application for the purposes of describing details of the surface contact holder of the preferred embodiment. The mobile phone includes a main body 10 with a first surface 111 and an opposite second surface 113. A receiving cavity 12 is defined at the main body 10 for receiving a battery (not shown). The receiving cavity 12 communicates with the first surface 111 and the second surface 113, and includes an end wall 122.

The surface contact card holder includes a stepped groove 14, a receiving groove 16, a sliding groove 17, a fixing portion 18, a latch 20, an elastic element 30 and two springs 50. The stepped groove 14, the receiving groove 16, the sliding groove 17 and the fixing portion 18 are formed in the main body 10.

The stepped groove 14 is defined in the end wall 122 of the main body 10, and is defined cooperatively by a bottom portion 142 and two stepped walls 144. Each stepped wall 144 has a step 1442. Adjacent to the stepped groove 14, the first surface 111 has the receiving groove 16 defined cooperatively by a bottom wall 162 and a peripheral wall. The receiving groove 16 is substantially rectangular in shape, and perpendicularly communicates with the stepped groove 14. The bottom wall 162 defines two pin holes 164, which are blind holes. A protrusion 146 is formed at the intersection of the bottom portion 142 and the bottom wall 162. The sliding groove 17 is defined in the bottom portion 142, and is positioned under the bottom wall 162. The shape and size of the sliding groove 17 are the same as those of the SIM card 40, thus the sliding groove 17 may be used for receiving the SIM card 40.

The second surface 113 defines a notch 114, and the notch 114 communicates with the sliding groove 17. The fixing portion 18 is formed adjacent to the sliding groove 17. The fixing portion 18 includes a stopper board 182 and two connecting boards 184. Each connecting board 184 is substantially L-shaped. A space 185 is cooperatively surrounded by the stopper board 182 and the connecting boards 184. The space 185 communicates with the notch 114 and the sliding groove 17. A slot 186 is defined between the stopper board 182 and the connecting boards 184. Each connecting board 184 sets a pivotal shaft 188. Each pivotal shaft 188 is substantially a short cylinder.

Figure 3:
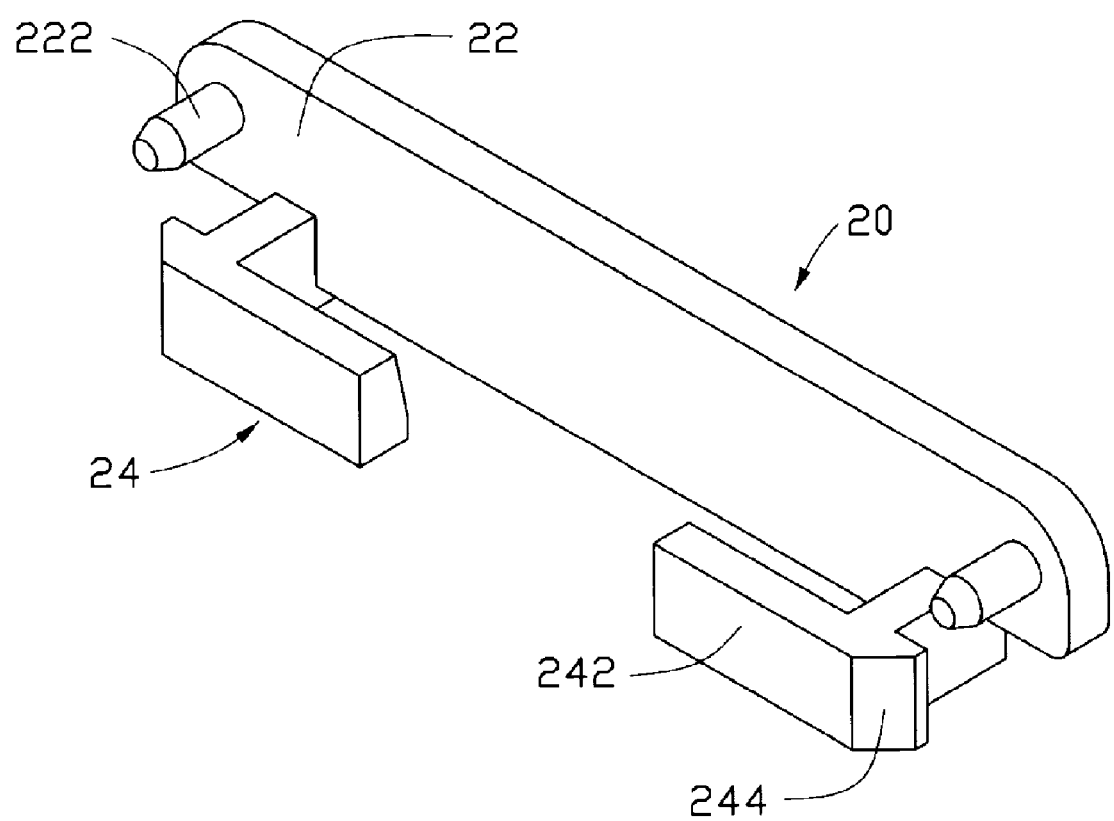
FIG. 3 is an enlarged, schematic view of the latch shown in FIG. 1.

Referring to FIG. 3, the latch 20 includes an operation portion 22 and two extending portions 24 perpendicularly extending from one side thereof. The shape of the operation portion 22 corresponds to that of the receiving groove 16 so that the operation portion 22 may be engaged in the receiving groove 16. The operating portion 22 extends two spaced pins 222 from two sides of one end surface toward two extending portions 24. Each pin 222 may be inserted into a corresponding pin hole 164. Each extending portion 24 is substantially L-shaped, and has a horizontal end 242. The horizontal ends 242 of two extending portions 24 are parallel to the operation portion 22. Each extending portion 24 has a wedge end 244 opposite to a corresponding horizontal end 242. A height of the operation portion 22 of the latch 20 is smaller than a depth of the receiving groove 16 so that the receiving groove 16 has a predetermined space allowing for the operation portion 22 to move upwards and downwards in the receiving groove 16.

Figure 4:
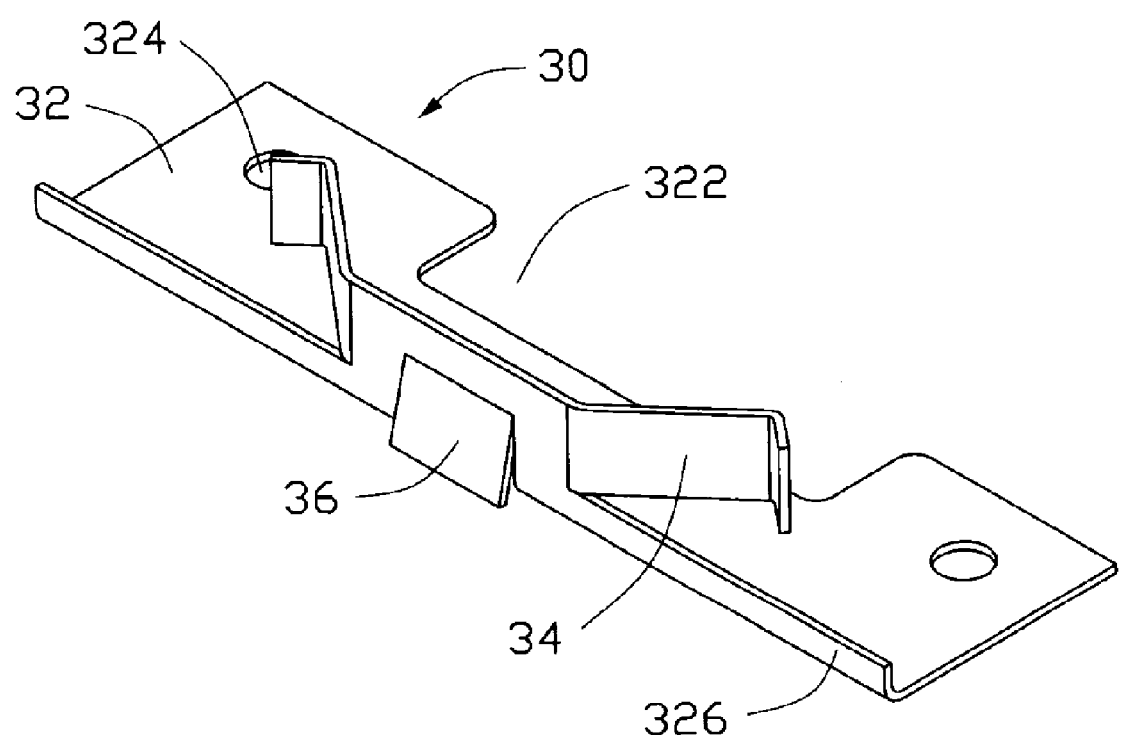
FIG. 4 is an enlarged, schematic view of the elastic element shown in FIG. 1.

Referring also to FIG. 4, the elastic element 30 may be sheet metal, and includes a main piece 32. The main piece 32 is substantially a flat board defining an opening 322, the opening 322 communicating with one side of the main piece 32. The main piece 32 has a pivotal hole 324 defined at two sides of the opening 322. The two pivotal shafts 188 of the fixing portion 18 may respectively engage in a corresponding pivotal hole 324. A side piece 326 perpendicularly extends from one side of the main piece 32 opposite to the opening 322. The side piece 326 further forms a bending piece 34 at one side thereof. The bending piece 34 is connected to a middle of the side piece 326. Two sides of the bending piece 34 are respectively bent into a V-shape pointing toward the direction of the opening 322. A resisting piece 36 is slantways formed in a middle of the bending piece 34 and the side piece 326 by cutting.

Each spring 50 is a cylindrical and helical element, and may be received in the pin hole 164. A diameter of each spring 50 is larger than that of each pin 222 so that each spring 50 may be placed around a corresponding pin 222.

Figure 5:
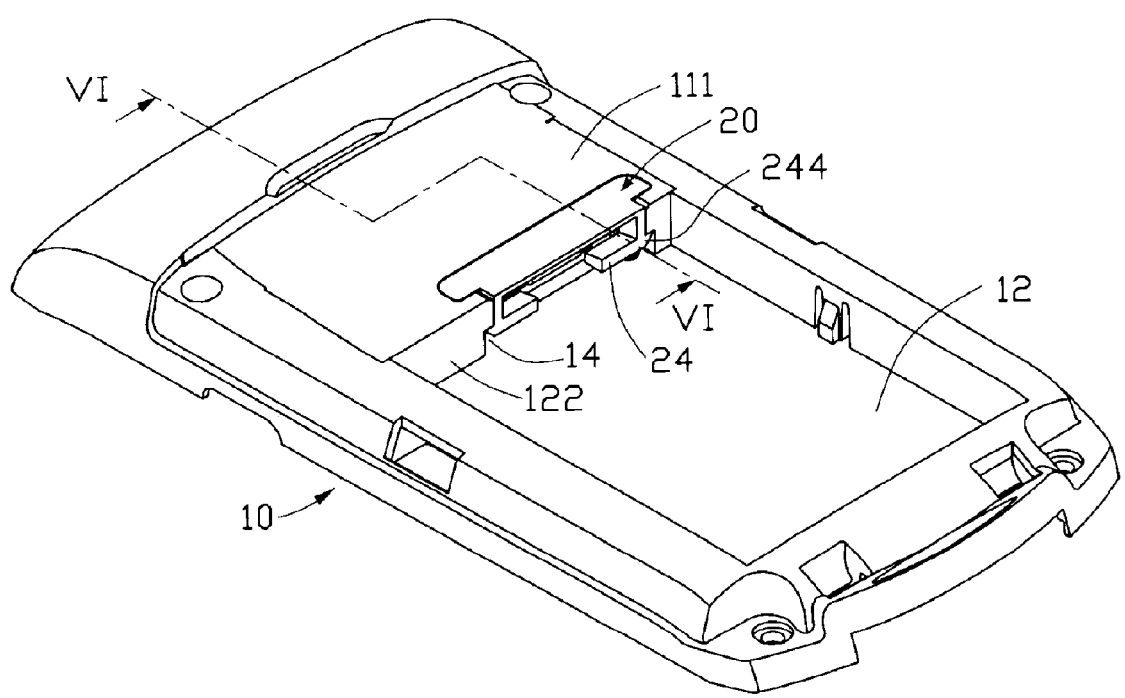
FIG. 5 is an assembled view of the surface contact card holder with the surface contact card.
Figure 6:
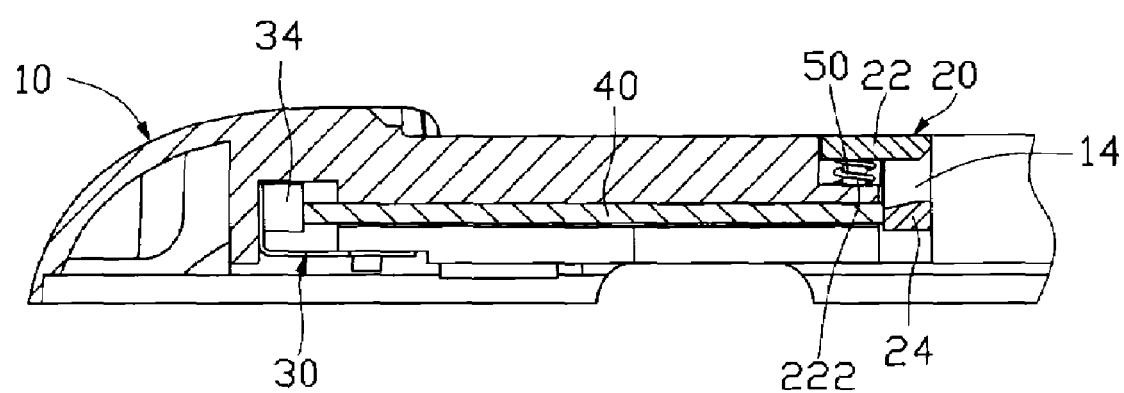
FIG. 6 is a cross-sectional view of the surface contact card holder taken along the VI-VI line in FIG. 5.
Figure 7:
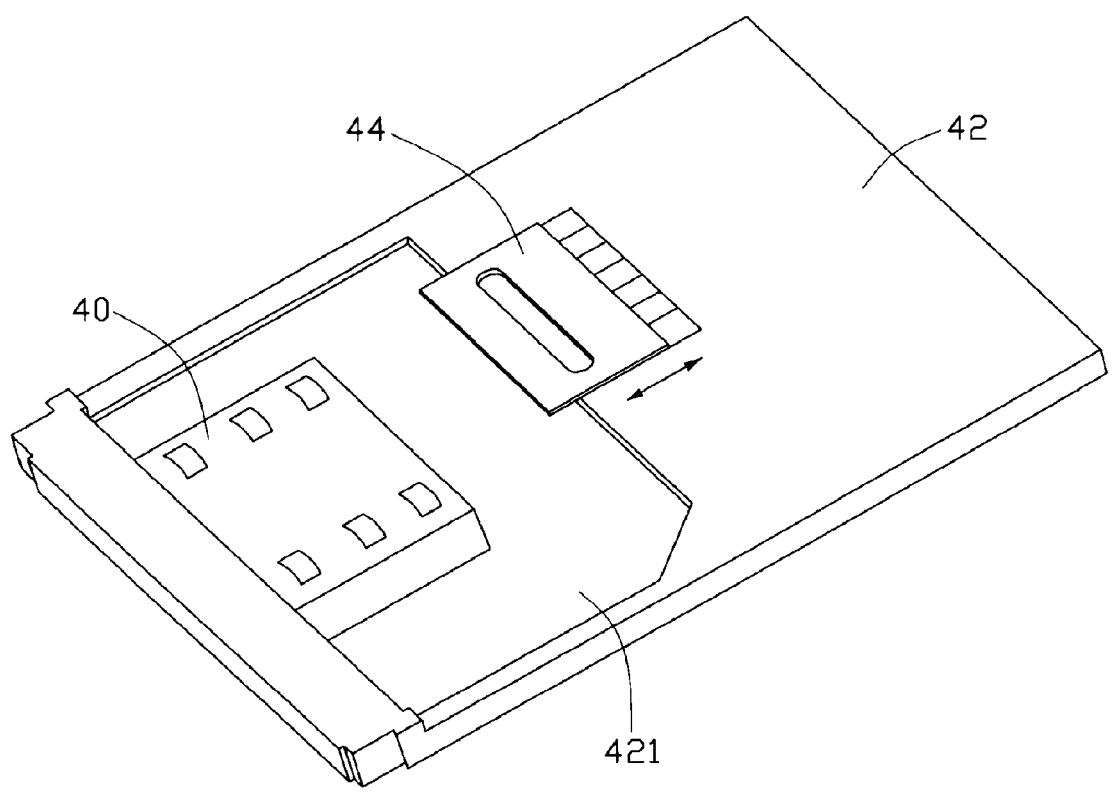
FIG. 7 is an assembled view of a conventional SIM card holder.

During assembly, referring to FIGS. 5 and 6, the main piece 32 of the elastic element 30 is placed on the fixing portion 18 of the main body 10. Each pivotal hole 324 is aligned with a corresponding pivotal shaft 188 of the fixing portion 18. Then, the elastic element 30 is pressed downward so that each pivotal hole 324 is placed around a given pivotal shaft 188. At the same time, the side piece 326 engages in the slot 186, with the resisting piece 36 resisting the stopper board 182 and the blending pieces 34 received in the space 185 of the fixing portion 18. Accordingly, the elastic element 30 is attached to the main body 10.

Next, the springs 50 are respectively placed around a corresponding pin 222. The latch 20 is faced with the receiving groove 16, with each pin 222 aligning with a corresponding pin hole 164. The latch 20 is pressed downward so that each pin 222 of the latch 20 with a corresponding spring 50 together are inserted into a given pin hole 164. Owing to the role of the springs 50, the pins 222 are suspended in the pin holes 164. At the same time, the extending portions 24 are lower into the stepped groove 14, and the wedge ends 244 slide down along the stepped wall 144 until each wedge end 244 engages with a corresponding step 1442. The horizontal ends 242 resist and partially enclose an entrance of the sliding groove 17 of the main body 10. Accordingly, the latch 20 is attached to the main body 10. Owing to the limitation of the step 1442, the latch 20 cannot break away from the stepped groove 14. The protrusion 146 may limit the movement range of the operation portion 22 of the latch 20.

In use, the user presses the operation portion 22 of the latch 20 downward. Thus, the pins 22 resist the springs 50 and move downwards. The springs 50 are compressed, and the pins 22 moves downward in the pin holes 164. After the latch 20 moves down until the extending portions 24 move away from the entrance of the sliding groove 17, the SIM card 40 is partially inserted into the sliding groove 17. Then, the user pushes one end of the SIM card 40 so that the SIM card 40 is entirely received into the sliding groove 17. The other end of the SIM card 40 presses into the elastic element 30 so that the bending piece 34 is deformable. After that, the user releases the latch 20 so that the latch 20 automatically returns the original position under the role of the springs 50. The extending portions 24 resist the entrance of the sliding groove 17 again so as to hold the SIM card 40. The SIM card 40 abuts the PCB. The battery (not shown) is received in the receiving cavity 12, with the battery abutting the latch 20. The battery can prevent the latch 20 from becoming separated from the main body 10. Thus, the SIM card 40 is held steadily in the main body 10.

To remove the SIM card 40, the user pushes the operation portion 22 of the latch 20, and presses the latch 20 downward. Thus, the extending portions 24 move away from the sliding groove 17. The SIM card 40 is pushed out by the elastic element 30 exerting a force on the SIM card 40. Accordingly, the SIM card 40 is taken out from the sliding groove 17.

In alternative embodiments, the stepped groove 14 may be not set adjacent to the receiving cavity 12, and is positioned outside of the main body 10. Accordingly, the SIM card 40 may easily be taken out without removing the battery. Alternatively, the stepped groove 14 may be omitted, and the latch 20 may be limited by other structures.

In a still further alternative embodiment, the fixing portion 18 and the elastic element 30 disclosed above may be replaced with other structures. Understandably, the fixing portion 18 may be omitted, and the elastic element 30 may be fixed in the main body 10 using adhesive. The elastic element 30 acts as a pushing element attached to the main body and exerts a force acting on the SIM card 40, the latch 20 is slidable relative to the receiving SIM card groove so as to allow the insertion and removal of the SIM card 40, and the pushing element serves to eject the SIM card 40 from the receiving SIM card groove. The latch 20 also may be replaced with other structures so that the latch may selectably resist one end of the SIM card 40.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A holder for holding a surface contact card comprising:
   a main body defining a receiving groove and a sliding groove, the receiving groove set at one side of the main body, the receiving groove including a groove bottom wall and a groove periphery, the sliding groove being configured for receiving the surface contact card therein;
   a latch engaging in the receiving groove and configured for selectably moving one of upward and downward relative to the groove bottom wall, the latch thereby being movable between an up latch position and a down latch position, the latch being configured for selectably resisting one end of the surface contact card when in the up latch position thereof;
   a fixing portion on the opposite side of the main body adjacent to the sliding groove; and
   an elastic element located in the fixing portion and configured for resisting the other end of the surface contact card, the elastic element providing a force allowing removal of the surface contact card.

2. The holder as claimed in claim 1, wherein the main body further defines a stepped groove, the stepped groove perpendicularly communicates with the receiving groove and the sliding groove.

3. The holder as claimed in claim 2, wherein the latch includes an operation portion and at least one extending portion, the operation portion is received in the receiving groove, and the at least one extending portion is received in the stepped groove so as to block one end of the sliding groove.

4. The holder as claimed in claim 3, wherein the number of the extending portions is two, each extending portion includes a horizontal end and an opposite wedge end, each horizontal end resists one end of the sliding groove, and each wedge end engages with the stepped groove.

5. The holder as claimed in claim 3, wherein the operation portion extends two spaced pins, the receiving groove is defined by a bottom wall, the bottom wall defines two pin holes, and each pin engages in a corresponding pin hole.

6. The bolder as claimed in claim 5, further comprising two springs, each spring is placed around each pin, and each pin is received together with each spring in a corresponding pin hole.

7. The holder as claimed in claim 1, wherein the fixing portion includes a stopper board and two connecting boards, each connecting board defines a pivotal shaft, the elastic element includes a main piece and a bending piece, the main pieces defines two pivotal holes for receiving the pivotal shafts.

8. The holder as claimed in claim 7, wherein an intersection between the stopper board and the connecting boards defines a slot, the elastic element further comprises a side piece, the side piece is connected with the main piece and the bending piece, and the side piece engages in the slot.

9. The holder as claimed in claim 8, wherein the elastic element further comprises a resisting piece, the resisting piece is formed in a middle of the side piece and the bending piece, the resisting piece resists the stopper board, and the bending piece is V-shaped.

10. A holder for holding a surface contact card in a portable electronic device having a device body, the holder comprising:
    a sliding groove being configured for receiving the surface contact card;
    a receiving groove being set at one side of the device body;
    a stepped groove perpendicularly communicates with the receiving groove and the sliding groove;
    a pushing element attached to the device body and exerting a force on the surface contact card; and
    a latch configured for resisting one end of the surface contact card;
    wherein the latch is slidable relative to the sliding groove so as to allow the insertion and removal of the surface contact card, and the pushing element serves to eject the surface contact card from the receiving groove.

11. The holder as claimed in claim 10, wherein the latch includes an operation portion and two extending portions, the operation portion is received in the receiving groove, and the two extending portions are received in the stepped groove so as to block one end of the sliding groove.

12. The holder as claimed in claim 11, wherein the operation portion extends two spaced pins, the receiving groove is defined by a bottom wall, the bottom wall defines two pin holes, and each pin engages in a corresponding pin hole.

13. The holder as claimed in claim 12, further comprising two springs, each spring is placed around each pin, and each pin with each spring together is received in a corresponding pin hole.

14. The holder as claimed in claim 10, wherein the device body includes a fixing portion, the fixing portion includes a stopper board and two connecting boards, each connecting board defines a pivotal shaft, the pushing element includes a main piece and a bending piece, the main piece defines two pivotal holes for receiving the pivotal shafts.

15. The holder as claimed in claim 14, wherein an intersection between the stopper board and the connecting boards defines a slot, the pushing element further comprises a side piece and a resisting piece, the side piece is connected with the main piece and the bending piece, the side piece engages in the slot, the resisting piece is formed in a middle of the side piece and the bending piece, the resisting piece resists the stopper board, and the bending piece is V-shaped.

16. A portable electronic device comprising:
    a device body defining a first groove, a second groove, and a third groove, the first groove and the second groove being configured for receiving a latch and the third groove for receiving a surface contact card, the first groove being in communication with the second groove, the latch selectably blocking one end of the third groove so as to keep the contact surface card in the third groove; and
    an elastic element set on the other end of the surface contact card and configured for pushing the surface contact card out of the third groove.

17. The portable electronic device as claimed in claim 16, wherein the latch includes an operation portion and two extending portions, the operation portion is received in the first groove, the two extending portions are positioned at the second groove and block one side of the third groove.

18. The portable electronic device as claimed in claim 17, further comprising two springs, wherein the operation portion extends two spaced pins, the first groove is defined by a bottom wall, the bottom wall defines two pin holes, and each pin engages in a corresponding pin hole, each spring is placed round a given pin, and each pin is received together with each spring in a corresponding pin hole.

19. The portable electronic device as claimed in claim 18, further comprising a fixing portion, the fixing portion is formed in the device body, the fixing portion includes a stopper board and two connecting boards, each connecting board defines a pivotal shaft, the elastic element includes a main piece and a bending piece, the main piece defines two pivotal holes for receiving the pivotal shafts.

20. The portable electronic device as claimed in claim 16, wherein a receiving cavity is defined in the device body adjacent to the second groove, the receiving cavity is configured for receiving a battery.

* * * * *